United States Patent Office

2,868,269
Patented Jan. 13, 1959

2,868,269

PROCESS OF TREATING SHEET MATERIAL AND PRODUCT RESULTING THEREFROM

Henry A. Letteron, Coshocton, Ohio, assignor to General Electric Company, a corporation of New York No Drawing. Application February 21, 1956
Serial No. 567,035

17 Claims. (Cl. 154—2.6)

This invention relates to a novel process for treating sheet material and to the products resulting therefrom. More particularly, this invention is directed toward the impregnation or bonding of sheet material with resins while the sheet material is maintained in roll form.

Many materials which are prepared in sheet form for use as electrical insulation find utility only when coated, impregnated or used in laminates. Heretofore, these impregnating and laminating processes have been generally carried out by dipping or brushing a solvent solution of the resin onto the sheet material and then passing the thus treated sheets horizontally through a drying oven to volatilize the solvent and cure the resin. Many of these materials are difficult to handle both because of their inherently fragile properties and because of the very thin sheets in which they are ordinarily processed. This has resulted in cumbersome or expensive manufacturing methods and unavoidable defects in the final quality of the product. These defects are particularly evident in the electrical insulation field, where the insulation material must possess uniform mechanical and dielectric propties.

A situation in which the above drawbacks are particularly brought into focus is in the production of micaceous insulation material. Mica, because of its excellent electrical and thermal properties, is an invaluable insulation material.

Bardet Patent 2,549,880 discloses a process for producing micaceous articles in which natural mica is partially dehydrated at an elevated temperature, for instance at about 800° C., after which the heat-treated flakes are placed in a liquid medium to produce a pulp. Thereafter, this pulp may be processed by conventional paper-making techniques such as is employed in making large-size sheets of paper or cardboard from cellulose pulp.

The micaceous sheets (hereinafter referred to as mica mat) produced as above-described are then ordinarily treated with various impregnating agents and utilized as thus treated or formed into laminates. In carrying out these procedures, extreme care must be taken in handling the mica mat, since the latter has very little resistance to shear and is brittle, i. e., stiff in relation to its tensile strength when compared to most organic papers. It has no moisture resistance and, in fact, is redispersed into a slurry on contact with water. These unfavorable properties are reduced by the treatment with various impregnating agents such as synthetic or natural resin compositions. However, the mechanical weakness of mica mat renders it very difficult to effect such treatment with impregnating agents in the ordinary way such as dipping, brushing, spraying, or roll coating. In all of these methods, the solvent used with the impregnating agent softens the mica mat to a greater or lesser degree. For instance, dry toluol reduces the tensile strength by one-half to one-third, while commercial denatured ethyl alcohol or water reduces the tensile strength of mica mat to practically zero. The impregnation of the mica mat with monomeric solutions to be later polymerized in situ, similarly weakens it. This lack of tensile strength makes it practically impossible to carry the treated mica mat through a drying oven without a carrier, and even then it is often broken into short lengths which are of less value than continuous or longer lengths. Further, the removal of solvent from treated mica mat causes puffing, blistering and surface rupturing, which increases its thickness and reduces its dielectric strength.

The present invention provides a process which not only reduces production costs but at the same time produces a product with unexpectedly enhanced mechanical and dielectric properties and, additionally, in some instances, certain products which can not be produced by prior methods. Treating speeds of two hundred feet per minute can be attained by the process of this invention in contrast to prior speeds of from five to twenty feet per minute. In addition, ribbons of insulating material can be produced in continuous lengths of upward of 1000 feet in contrast to prior lengths of 4–6 feet. This is because of the superior uniformity of the product of the present invention and the consequent avoidance of the prior necessity of cutting out imperfect portions of the sheet. The substantial elimination of the use of solvents results not only in a saving of the cost of the solvent itself, but eliminates the expense of long drying ovens and the costs of their operation. The resin-treated product of this invention is superior to prior products in its freedom from rupture and from points of low dielectric strength and in its high resistance to voltage stress per unit of thickness.

It is therefore a principal object of this invention to provide a process for impregnating sheet material which, first, does not involve mechanical handling while the material is weakened with solvent; second, increases speeds of production with subsequent savings in cost; third, eliminates the necessity for removal of solvent by oven drying; and, fourth, produces a novel product with greatly improved mechanical and electrical properties.

In general, my invention is carried out by placing in contiguous relation and in roll form the sheet material and at least one backing material carrying a substance selected from the group consisting of resins and resin-forming monomers. The thus rolled materials are then allowed to remain contiguous to one another in order for transfer of the resinous substance to occur. The time for this transfer to take place will vary widely, depending upon the particular material treated, the resins or resin-forming monomers used, and the viscosity of the resin solutions. One or more backing materials may be used in the same roll and the roll may consist of hundreds of feet in length.

In carrying out this invention, substantially the same process is followed whether a single impregnated sheet or a laminate is to be produced. In both instances, a backing material is employed as a carrier to transfer the resinous substance. Where a single impregnated sheet is desired as the final product, the backing material is later stripped and discarded; if the final product is to be a laminate, the backing material remains as an integral part of the laminate. This backing material may be any self-sustaining film or sheet. Examples of such backing materials are polyester film, rope paper, glass cloth, glass thread reinforced rope paper, kraft paper, cotton cloth, cellulose acetate and various other well-known backing materials useful for this purpose.

The sheet material to be treated and whose fragile properties are particularly suitable to the roll transfer process of this invention, may in addition to mica mat specifically, be any organic or inorganic material whose mechanical properties are improved by resin treatment. Examples are short fiber asbestos, bentonite, glass fibers, acrylonitrile fiber, polyester fiber and micaceous materials. In the description which follows, particular reference will be made to micaceous materials and more particularly to the mica mat produced as above described. Although this invention is considered especially adapted to the requirements of the last mentioned micaceous materials, it possesses many advantages with the aforementioned other organic or inorganic sheet materials and all such materials are included within the scope of the invention.

The impregnating agents used in treating the backing material may be any of the known organic resins or silicones used in impregnating sheet material or in forming laminates of sheet material. These resinous materials may be used either as the polymers per se or the material to be treated may be impregnated with the monomers, and the polymerization may take place in situ, as will be more clearly described hereinafter. Examples of suitable resinous materials are phenol, urea and melamine formaldehyde condensation products, alkyd resins, oil modified alkyds, mixtures of alkyds and vinyl esters, mixtures of polyesters and epoxides, vinyl resins and the like. The alkyds may be produced in known fashion by the reaction of a polyhydric alcohol such as glycerine, pentaerythritol or ethylene glycol with a polybasic acid such as phthalic or maleic acids or their anhydrides with or without modifying agents such as oils or oil acids, e. g., coconut, castor, soya, linseed and the like. Alkyd-vinyl ester mixtures suitable for use in this invention are disclosed in U. S. patent 2,319,826, issued May 25, 1943, to Pellett and assigned to the same assignee as the present invention. The aforesaid patent discloses blended or heat reacted mixtures of a polyvinyl ester resin, a maleic anhydride-pentaerythritol resin and a resin obtained by reacting glycerine with 3,6-endomethylene-Δ-4-tetrahydrophthalic anhydride. Polyester-epoxide resins useful in this invention are described in U. S. patent 2,707,204 to Richardson et al., issued April 26, 1955, and assigned to the same assignee as the present invention. This latter patent discloses mixtures of ingredients which contain (1) an acidic polyester containing free carboxyl groups and comprising the product of reaction of a mixture of ingredients comprising glycerine and an aliphatic dicarboxylic acid containing from 5 to 10 carbon atoms, and (2) a complex epoxide resin comprising a polyether derivative of a polyhydric organic compound, e. g., a polyhydric alcohol or phenol, containing epoxy groups. Particularly suitable vinyl resins are the polymerized alkyl acrylates (methyl, ethyl, butyl, octyl, etc.) cross linked with from 5 to 50% of a polyester cross linking agent. The silicone resins may be polymers of methyl or phenyl siloxane and the like. Natural resins, such as lac, button lac and shellac may also be used. The resin solutions should contain from 25 to 100% and preferably from 50 to 100% of solids, by weight.

In the practice of my invention, a backing material is coated with a resin solution as, for example, by passing between steel rollers, spaced from one another a prescribed distance. One of the rollers rotates in a bath of resin solution with a 25-100% resin solids content. The treated backing material is placed contiguous to the untreated mica mat and the two materials are wound simultaneously on a core.

Complete transfer for purposes of impregnation, or distribution between backing material and mica mat for purposes of bonding, may be controlled by suitably adjusting the quantity of resinous material used. It has been found that if the amount of resin is less than 35%, by weight, of the mica mat, that substantially complete transfer takes place from the backing material to the mica mat. Between about 30-35% however, there may be some difficulty in removing the backing material. Our preferred range for the impregnation of a single sheet is therefore from about 5 to 30% resin by weight of the mica mat. On the other hand, in order to bond the backing material to the mica mat, at least 25% of resin, by weight, of the mica mat should be used. When from about 25-30% of resin is used however, the bond may be weak and a preferred lower limit is therefore about 30%. The percentage of resin used to form a laminate may range as high as 50% but preferably is 40% or less. The amount of resin for a particular application will vary within the above limits depending upon the requirements of the product. A rigid, inflexible product will generally require less resin and conversely a flexible product will require more resin.

When polymerization is to take place in situ, the composite roll is placed in an oven after resin transfer is completed. It is important to remember that this is effected only while the material is held firmly in place in roll form in order to avoid damage by the mechanical handling of the mica mat. The entire roll may be unwound after the heat treatment as a continuous ribbon of treated or laminated mica mat.

In order that those skilled in the art may better understand how the present invention may be practiced, the following examples are given by way of illustration and not by way of limitation. All parts are by weight.

*Example 1*

This example illustrates the preparation of a three-layered laminate of mica mat, rope paper and glass thread reinforced rope paper bonded with a mixture of an acidic polyester and an epoxide resin.

The resinous material was made by dissolving 8 parts of an acidic glyceryl adipate and 52 parts of an epoxide resin, specifically Epon 1004, sold under that name by Shell Chemical Corporation and having an epoxide equivalent of 905 to 985, in 9 parts of 99% isopropyl alcohol and 31 parts of toluol. A continuous ribbon of 13-inch wide and .001-mil thick rope paper was coated by reverse roll coating at the rate of .111 to .137 gram per square inch with the above solution. This treated rope paper was wound with a tension of about .3 lb. per inch of width on a 13-inch diameter cardboard core. At the same time, a 13-inch wide ribbon of 4-mil mica mat, and a 13-inch wide ribbon of glass thread reinforced rope paper were wound on the same core. When about 200 yards of material had been wound up, the machine was stopped, the ends of the three materials severed from their supply rolls and fastened with 1-inch adhesive tape to prevent premature unwinding. Twenty-four hours or more later, the adhesive tape was removed and the three materials unwound. It was found that they had formed a three-layer continuous laminate of resin-treated mica mat between two reinforcing papers.

The laminate of the above example was examined and found to have no places where cracking or separation had occurred.

*Example 2*

This example illustrates the production of a two-layer laminate of mica mat and glass-thread reinforced rope paper, bonded with a resin which is polymerized in situ.

A resin-forming monomer was made by dissolving five parts of a reactive plasticizer and one part of t-butyl perbenzoate in 94 parts of 2-ethyl hexyl acrylate. The reactive plasticizer was a reaction product of maleic anhydride, adipic acid and diethylene glycol. A 13-inch wide continuous ribbon of glass thread reinforced rope paper was treated at the rate of .04 to 0.6 gram per square inch with the above monomer and wound on a 5-inch cardboard core, with a tension of about .3 lb. per inch of width. At the same time, a 13-inch wide ribbon of .004" thick mica mat and a 13-inch wide ribbon of .003" thick kraft paper were wound on the same core. After about 200 yards of material had been wound up, the ends of the three materials were severed from their supply rolls and kept from premature unrolling with adhesive tape. After about an hour at room temperature, the roll thus formed was suspended in an oven at 130-150° C. for about 8 hours. On cooling, the adhesive tape was removed and the materials were unrolled. It was found that the mica mat was completely impregnated with 20 to 27% of a rubbery polymer and that the glass thread reinforced paper was firmly bonded to one face of the treated mica mat. The kraft paper contained very little polymer and could be removed without damage.

The continuous laminate of glass thread reinforced rope paper and treated mica mat of the above example was slit to narrower widths and used for insulating conductors of electrical machinery. It was found that this tape was flexible and strong, with high dielectric strength, and undamaged either in physical or electrical properties by exposure to temperatures as high as 135° C. for a period of three months.

In the above example, in place of the glass-thread reinforced rope paper, other backing material could have been used. A particularly suitable substitute is a polyester film sold under the name of Mylar by E. I. du Pont de Nemours and Company, Wilmington, Delaware. These films are made of oriented polyethylene terephthalate and have exceptional strength. A laminate of mica mat between two layers of polyester film made in accordance with the above example possesses excellent electrical and mechanical properties. A further modification of the above example found to possess many uses consists of a layer of glass cloth and a layer of mica mat covered on each face with a layer of polyester film and bonded with the resin of the above example.

*Example 3*

This example illustrates the making of a three-layered laminate of rope paper and mica mat, bonded with an oil-modified alkyd resin.

A continuous ribbon of 40-inch wide rope paper .001" thick was coated by reverse roll coating with an oil-modified alkyd resin solution, made by reacting phthalic anhydride, glycerine and pentaerythritol and adding 30% coconut oil fatty acids. The coating was carried out at the rate of from 5.5 to 6.0 grams per square foot and wound on a 13-inch diameter cardboard core with a tension of about .3 lb. per inch of width. At the same time, a 40-inch wide continuous ribbon of .002" mica mat, and another 40-inch wide ribbon of .001" thick rope paper were wound on the same core. After about 120 lb. of material had been wound up, the winding was stopped, the ends of the three materials severed from their supply rolls, and the end of the three-layer roll fastened with adhesive tape to prevent premature unrolling. The roll was suspended in a rack overnight. The next day it was discovered that the resin solution had thoroughly premeated the mica mat and the second rope paper, so that a three-layer continuous laminate of treated mica mat between two rope papers was formed. It was greenish-brown in color, quite translucent, and very flexible. An analysis showed that it contained about 37% resin and about 14% solvent, by weight.

The laminate of the above example was slit into rolls ½" wide and about 35 yards long, and subjected to the following tests: This tape was electrically proof-tested by passing it between metallic rolls with 1500 volts of stress. It was found that there were no failures in 200 feet of length. Six ⅝" x ⅜" x 24" long steel bars were covered with one layer of this tape and electrically tested over a 16-inch length. It was found that the average voltage stress to cause failure was 1880 volts, whereas tape made with dilute solutions with subsequent oven drying usually failed at 1400 to 1600 volts in the same test.

*Example 4*

This example illustrates the impregnation of mica mat with an alcoholic solution of shellac.

A 40-inch wide continuous ribbon of .003" thick kraft paper was coated by reverse roll coating with an alcoholic solution containing 35% shellac, by weight, and wound with a tension of about .3 lb. per inch of width on a 5" diameter cardboard core. At the same time, a 37" wide continuous ribbon of mica mat .004" thick, and a 37" wide continuous ribbon of .003" thick kraft paper, were wound on the same roll. After about 120 lb. of material had been wound up, the ends of the three materials were severed from their supply rolls and the roll was sealed to prevent premature unwinding. The roll was wrapped with several turns of polyester film, which was sealed to form a fairly tight cover against solvent evaporation. The roll was suspended in a rack for three days. The seal was then broken and part of the roll unwound. It was found that the major portion of the shellac had permeated the mica mat to give it a reddish-brown color throughout. Furthermore, the color showed a fairly uniform distribution from one surface to the other, whereas, when mica mat is treated with a thin solution of shellac and the solvent evaporated in an oven, there is always a portion in the center which is deficient in resin and is not colored. Eleven pieces of the treated mica mat 37" x 48" were separated from the kraft paper and pressed at 155° C. and 1300 p. s. i. in known manner to form a strong laminate about 1/32" thick, useful for making commutator segments.

*Example 5*

This example illustrates the impregnation and in situ polymerization of mica mat.

A 13-inch wide continuous ribbon of .003' thick kraft paper was treated by reverse roll coating with the resin-forming monomer described in Example 2, at the rate of about 6 grams per square foot, and wound with a tension of about .3 lb. per inch of width on a 5" diameter cardboard core. At the same time, a 13" wide continuous ribbon of 4-mil mica mat and a 13" wide .003-inch thick kraft paper were wound on the same core. When about 100 yards of material had been wound up, the materials were severed from their supply rolls and the roll sealed with adhesive tape to prevent premature unrolling. After about 5 hours, the roll was suspended in an oven at about 130° C. for about 16 hours. After cooling, it was found that the mica mat was impregnated with about 25% of a rubbery resin and had become quite strong and flexible. The treated mica mat was rewound on another 5" diameter cardboard core in a continuous length, while the two kraft papers which contained very little resin were separated from it without damage.

It was found that the tensile strength of the treated mica mat was over 10 lb. per inch of width compared with about 4 lb. per inch before processing. It was also found that the voltage with 2-inch electrodes required to puncture it was over 3000, whereas only about 1600 volts had been required to cause breakdown in unprocessed mica mats. The flexible insulating ribbon formed in this example was useful for wrapping electrical conductors by itself, or as an insulating layer to which other materials could be bonded to form a composite insulation in continuous lengths.

*Example 6*

This example illustrates the making of a three-layer laminate of polyester film and mica mat, bonded with an oil-modified alkyd resin.

A continuous ribbon of polyester film .001" thick and 12" wide was coated on one side by reverse roll coating with about 8 grams per square foot of an oil-modified phthalic anhydride-glycerine alkyd resin, which contained about 70% soya bean oil fatty acid. This treated film and a 12" wide continuous ribbon of .004" thick mica paper and another 12" wide continuous ribbon of .001" thick polyester film were wound together on a 5" cardboard core to form a continuous spiral. When about 500 feet had been so wound, the materials were severed from their supply rolls and the end of the spiral held with adhesive tape to prevent unrolling. After 24 hours, it was found that a transparent laminate had been formed with a layer of polyester film bonded to each face of a layer of resin-treated mica paper. This laminate was very flexible and strong, with high dielectric strength. It could be slit into narrow widths, such as 1 inch more or less, and used as a tape for insulating the conductors of electrical machines. It also could be cut into flat shapes suitable for slot liners, phase insulation, or under binding wires.

If desired, the above resin could have been cured to give greater stiffness, stronger bonding, and more resistance to crushing. This could have been accomplished by storing the roll at elevated temperatures, such as 100° C. for a few days, but was accomplished at room temperature in about a month. If it has been desired to accomplish the curing more rapidly, metallic driers such as 0.5% lead, 0.05% manganese and 0.001% cobalt, by weight, based on the resin could have been added to it before making the laminate. Contrariwise, if it had been desired that the resin remain uncured during prolonged storage, 5% of liquid pine tar or 1% hydroquinone could have been mixed with the resin before use. Other thicknesses of polyester film and mica paper could have been used in the same manner. Also, two layers of polyester film could have been coated and wound up with two layers of mica paper to give a four-layer laminate, if desired.

While this invention has been described with particular reference to single or multilayered insulation materials, this invention has utility in other than insulating applications. Resin treated sheet materials made in accordance with this invention can be used as structural and mechanical elements, as decorative tops, as light diffusing panels and for other well known uses of resin impregnated and resin bonded sheet materials.

What I claim as new and desire to secure by Letters Patent of the United States is:

1. A process for the impregnation of brittle sheet material comprising the steps of placing at least one backing material and the brittle sheet material in contiguous relation and winding the materials simultaneously on a core, at least one backing material carrying a substance selected from the group consisting of resins and resin forming monomers, and allowing the materials to remain contiguous to one another in order for transfer and impregnation of the aforesaid resinous substance to occur.

2. A process for the impregnation of brittle sheet material comprising the steps of placing at least one backing material and the brittle sheet material in contiguous relation and winding the materials simultaneously on a core, at least one backing material carrying no more than 35% by weight of the sheet material of a substance selected from the group consisting of resins and resin forming monomers, allowing the materials to remain contiguous to one another in order for transfer and impregnation of the aforesaid resinous substance to the sheet material to occur, unwinding the composite roll and removing the backing material.

3. A process for the bonding and impregnation of brittle sheet material and at least one backing material to form a composite laminate comprising the steps of placing at least one backing material and the brittle sheet material in contiguous relation and winding the materials simultaneously on a core, at least one backing material carrying at least 25% by weight of the sheet material of a substance selected from the group consisting of resins and resin forming monomers, allowing the materials to remain contiguous to one another in order for distribution and impregnation of the aforesaid resinous substance to occur and unwinding the roll as a composite laminate.

4. The process of claim 1 in which the sheet material is micaceous material.

5. The process of claim 1 in which the sheet material is mica mat.

6. The product of the process of claim 5.

7. The process of claim 2 in which the sheet material is mica mat.

8. The process of claim 3 in which the sheet material is mica mat.

9. The process of claim 8 in which the resin is an oil-modified alkyd resin.

10. The process of claim 8 in which the resin is an acidic polyester-epoxide resin.

11. The process of claim 8 in which the resin forming monomer comprises an alkyl acrylate.

12. The process of claim 8 in which at least one backing material is a polyester film.

13. The product of the process of claim 12.

14. The process of claim 8 in which at least one backing material is glass cloth.

15. The product of the process of claim 14.

16. The process of claim 10 in which at least one backing material is rope paper.

17. The product of the process of claim 16.

References Cited in the file of this patent

UNITED STATES PATENTS

| | | |
|---|---|---|
| 2,407,549 | Gurwick | Sept. 10, 1946 |
| 2,537,126 | Francis | Jan. 9, 1951 |
| 2,542,827 | Minter | Feb. 20, 1951 |
| 2,556,078 | Francis | June 5, 1951 |

UNITED STATES PATENT OFFICE

CERTIFICATE OF CORRECTION

Patent No. 2,868,269

January 13, 1959

Henry A. Letteron

It is hereby certified that error appears in the printed specification of the above numbered patent requiring correction and that the said Letters Patent should read as corrected below.

Column 8, line 39, for the claim reference numeral "10" read -- 8 --.

Signed and sealed this 19th day of April 1960.

(SEAL)
Attest:

KARL H. AXLINE
Attesting Officer

ROBERT C. WATSON
Commissioner of Patents